Feb. 22, 1938.   H. P. SORENSEN   2,108,975
REINFORCING NUT
Filed March 19, 1936

INVENTOR.
Henry Peirce Sorensen
BY J. Windsor Davis
ATTORNEY.

Patented Feb. 22, 1938

2,108,975

UNITED STATES PATENT OFFICE 2,108,975

REINFORCING NUT

Henry Peirce Sorensen, Detroit, Mich.

Application March 19, 1936, Serial No. 69,633

1 Claim. (Cl. 85—32)

This invention relates to means for re-inforcing sheet metal at local points at which it is desired to attach articles or members as by bolting.

In many arts as for instance in the automotive industry it is desirable to have numerous points of attachment of various members to comparatively large pieces of sheet metal which have been carefully formed. Under such circumstances it is highly desirable and, in fact, essential that a re-inforcment of the sheet metal be made and that it be made in such manner as not to cause deformation of the sheet. It is therefore the primary object of this invention to provide a nut means in the form of a sheet metal re-inforcing means which can be applied to the sheet at desired points and secured thereto in production either by spot welding or by bradding with a minimum of sheet deformation.

A specific object of the invention is to provide a nut with wings or ears formed therefrom in such manner that the metal adjacent the wings forms a backing for bradding so that the sheet through which the wings extend is not deformed by the bradding operation.

Another and important object is to provide a nut and wing formation which can be made out of ordinary strip stock and hence at considerably less cost than similar nuts now being used.

Figures 1, 2, 3, 4:
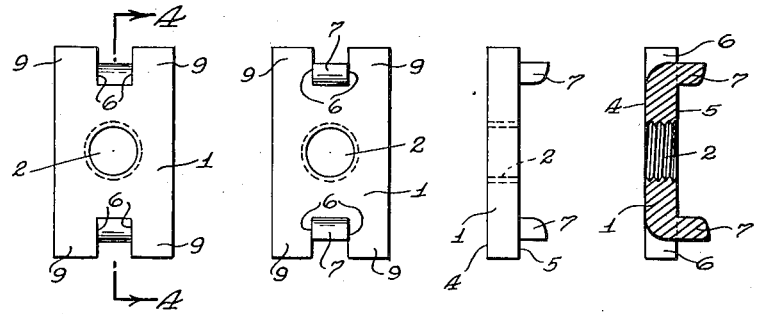
Figure 6:
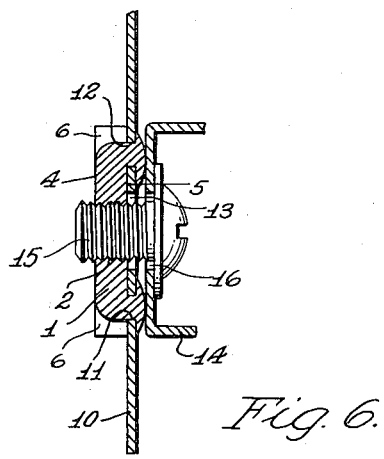
Figure 5:
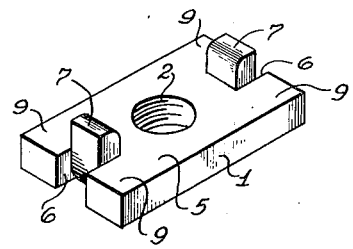

Other objects and advantages will become hereinafter more fully apparent as reference is had to the accompanying drawing wherein my invention is illustrated and in which Figure 1 is a bottom plan view of the re-inforcing means, Figure 2 is a top plan view, Figure 3 is a side elevation, Figure 4 is a section taken along the line 4—4 of Figure 1, Figure 5 is a perspective view, and Figure 6 is a sectional view of the re-inforcing means applied to a sheet metal.

I indicates a nut having a tapped opening 2. The top and bottom sides 4 and 5 are parallel and hence the bolt can be made from ordinary strip stock metal. The blank is preferably of rectangular shape and the longer sides are cut along parallel lines 6 to form two radial wings, or ears, the outer ends of which are then bent out of the plane of the nut proper. The ears 7, as thus formed, are of substantially constant thickness throughout their length and the base of each one is of a thickness equal to the thickness of the nut proper. The ears 7 and the opening 2 are preferably alined.

With this nut formation the portions 9 may be said to project outwardly beyond the base of each ear 7 to form supports or backing for bradding as illustrated in Figure 5. In this figure, the sheet of metal 10 is to be reinforced. Three alined openings 11, 12, 13 are punched or otherwise provided in the sheet and the ears 7 are inserted through the end ones 11 and 13 of these openings with the top side 5 contacting the sheet and the tapped hole 2 overlying the opening 12. The ends of the ears 7 are then deformed, as by bradding, spot welding or the like.

The deformed ends of the ears are, of course, flattened against the sheet as nicely as can be done in production without deformation of the sheet. A member 14 is then ready for attachment to the sheet 10 by insertion of a bolt or screw 15 through a hole 16 provided for the purpose and into the tapped hole 2.

What I claim is:

A nut adapted to be riveted to sheet material, said nut comprising a flat rectangular body having a central threaded hole and having a notch in each end, the material from the notches being bent up towards the center of the nut to form rivets projecting up from one face of the nut, the base of each rivet being surrounded on three sides by the flat body of the nut.

HENRY PEIRCE SORENSEN.